US012652694B2

(12) United States Patent
Hao et al.

(10) Patent No.: US 12,652,694 B2
(45) Date of Patent: Jun. 9, 2026

(54) CONFIGURATION OF INTERMEDIATE SET SIZE FOR FREQUENCY DOMAIN BASIS REPORTING

(71) Applicant: QUALCOMM Incorporated, San Diego, CA (US)

(72) Inventors: Chenxi Hao, Beijing (CN); Yu Zhang, San Diego, CA (US); Chao Wei, Beijing (CN); Qiaoyu Li, Beijing (CN); Liangming Wu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 18/779,987

(22) Filed: Jul. 22, 2024

(65) Prior Publication Data

US 2025/0024487 A1 Jan. 16, 2025

Related U.S. Application Data

(63) Continuation of application No. 17/593,823, filed as application No. PCT/CN2020/085774 on Apr. 21, 2020, now Pat. No. 12,047,995.

(51) Int. Cl.
*H04W 72/04* (2023.01)
*H04B 7/04* (2017.01)
(Continued)

(52) U.S. Cl.
CPC ........ *H04W 72/563* (2023.01); *H04B 7/0481* (2023.05); *H04B 7/0486* (2013.01);
(Continued)

(58) Field of Classification Search
CPC ............. H04W 72/0453; H04W 72/23; H04W 72/542; H04W 72/563
See application file for complete search history.

(56) References Cited

U.S. PATENT DOCUMENTS

| 10,020,860 B2 * | 7/2018 | Onggosanusi ....... H04B 7/0479 |
| 10,079,631 B2 * | 9/2018 | Jöngren .............. H04B 7/0456 |

(Continued)

FOREIGN PATENT DOCUMENTS

| CN | 107005322 A | 8/2017 |
| CN | 109474322 A | 3/2019 |

OTHER PUBLICATIONS

Ericsson: "On CSI enhancements for MU-MIMO", 3GPP TSG RAN WG1 Meeting Ad-Hoc Meeting 1901, R1-1900757, Taipei, Taiwan, Jan. 21-25, 2019, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019, 12 pages, XP051593604.

(Continued)

*Primary Examiner* — Alpus Hsu

(74) *Attorney, Agent, or Firm* — Patterson + Sheridan, L.L.P.

(57) ABSTRACT

Certain aspects of the present disclosure provide techniques for channel state information (CSI) reporting with frequency domain (FD) compression. A method that can be performed by a user equipment (UE) includes determining the size of the intermediate set based on one or more parameters included in the CSI report configuration, determining one or more FD bases for each layer based on the intermediate set, wherein the one or more FD bases are characterized by an M value indicative of a number of the one or more FD bases and based on the CSI report configuration, and reporting the one or more FD bases for each layer based on the size of the intermediate set.

14 Claims, 12 Drawing Sheets

(51) Int. Cl.

| | | |
|---|---|---|
| *H04B 7/0456* | (2017.01) | |
| *H04W 72/0453* | (2023.01) | |
| *H04W 72/23* | (2023.01) | |
| *H04W 72/542* | (2023.01) | |
| *H04W 72/563* | (2023.01) | |

(52) U.S. Cl.
CPC ....... *H04W 72/0453* (2013.01); *H04W 72/23* (2023.01); *H04W 72/542* (2023.01)

(56) References Cited

U.S. PATENT DOCUMENTS

| | | | | |
|---|---|---|---|---|
| 10,735,070 | B2 * | 8/2020 | Wei | H04B 7/0479 |
| 11,177,862 | B2 | 11/2021 | Wei | |
| 12,047,995 | B2 | 7/2024 | Hao et al. | |
| 2009/0248770 | A1 | 10/2009 | Ray et al. | |
| 2014/0056156 | A1 * | 2/2014 | Jongren | H04B 7/0456 370/252 |
| 2016/0156401 | A1 | 6/2016 | Onggosanusi et al. | |
| 2018/0198497 | A1 | 7/2018 | Wei et al. | |
| 2019/0020398 | A1 * | 1/2019 | Jöngren | H04W 24/02 |
| 2019/0157770 | A1 | 5/2019 | Park et al. | |
| 2019/0260434 | A1 | 8/2019 | Park et al. | |
| 2019/0334587 | A1 | 10/2019 | Rahman et al. | |
| 2019/0364546 | A1 | 11/2019 | Kwak et al. | |
| 2020/0235790 | A1 | 7/2020 | Rahman et al. | |

OTHER PUBLICATIONS

International Search Report and Written Opinion—PCT/CN2019/084644—ISA/EPO—Dec. 31, 2019.
International Search Report and Written Opinion—PCT/CN2020/085774—ISA/EPO—Jul. 23, 2020.
Qualcomm Incorporated: "CSI Enhancement for MU-MIMO Support," 3GPP TSG RAN WGI Meeting #96bis, R1-1905025, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019, 16 pages, XP051700134, Paragraph 3.2, The whole document.
Samsung: "Chairman's Notes of AI 7.2.8 Enhancements on MIMO for NR", 3GPP TSG RAN WG1 Meeting #96bis, R1-1905803, Xi'an, China, Apr. 8-12, 2019, Apr. 12, 2019 (Apr. 12, 2019), 13 Pages, the whole document, section 7.2. 8. 1.
Samsung: "CSI Enhancement for MU-MIMO", 3GPP TSG RAN WG1 meeting #96bis, R1-1905618, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019, pp. 1-8, XP051700356, The whole document.
Samsung: "Feature Lead Summary for MU-MIMO CSI—Revision on Selected Issues", 3GPP TSG RAN WG1 96bis, R1-1905629, Xi'an, China, Apr. 12-16, 2019, Apr. 16, 2019(Apr. 16, 2019) Section 2, 17 Pages.
Samsung: "Feature Lead Summary for MU-MIMO CSI", 3GPP TSG RAN WG1 96bis, R1-1904448, Xi'an, China, Apr. 12-16, 2019, Apr. 16, 2019 (Apr. 16, 2019) Section 2, 17 Pages.
Samsung: "Feature Lead Summary for MU-MIMO CSI Tuesday Offline Session", 3GPP TSG RAN WG1 96bis, Xi'an, China, Apr. 12-16, 2019, R1-1905724, 4 pages, Apr. 16, 2019 (Apr. 16, 2019), p. 3, Alt 5.5, Sections 1-2.
Supplementary European Search Report—EP20795506—Search Authority—Munich—Nov. 29, 2022.
ZTE: "CSI Enhancement for MU-MIMO Support", 3GPP TSG RAN WG1 Meeting #96 R1-1901633, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, 16 Pages, XP051599330, p. 1- p. 4.

* cited by examiner

610

| | | | | |
|---|---|---|---|---|
| RI = 4 | M | M | M2 < M | M2 < M |
| RI = 3 | M | M | M2 < M | |
| RI = 2 | M | M | | |
| RI = 1 | M | | | |
| | Layer 0 | Layer 1 | Layer 2 | Layer 3 |

620

| | | | | |
|---|---|---|---|---|
| RI = 4 | M2 < M | M2 < M | M2 < M | M2 < M |
| RI = 3 | M2 < M | M2 < M | M2 < M | |
| RI = 2 | M | M | | |
| RI = 1 | M | | | |
| | Layer 0 | Layer 1 | Layer 2 | Layer 3 |

630

| | | | | |
|---|---|---|---|---|
| RI = 4 | M40 < M | M41 < M | M42 < M | M43 < M |
| RI = 3 | M30 < M | M31 < M | M32 < M | |
| RI = 2 | M | M | | |
| RI = 1 | M | | | |
| | Layer 0 | Layer 1 | Layer 2 | Layer 3 |

1000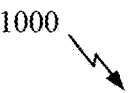

1005

RECEIVE, FROM A BASE STATION, CHANNEL STATE INFORMATION (CSI) REPORT CONFIGURATION, CONFIGURING THE UE FOR REPORTING FREQUENCY DOMAIN (FD) BASIS INFORMATION INCLUDING ONE OR MORE PARAMETERS CONFIGURED BY THE BASE STATION FOR CALCULATING A SIZE CORRESPONDING TO AN INTERMEDIATE SET OF A PLURALITY OF FD BASES, WHEREIN THE INTERMEDIATE SET IS COMMON TO ALL LAYERS OF A FIRST RANK, AND THE INTERMEDIATE SET IS A SUBSET OF THE PLURALITY OF FD BASES

1010

DETERMINE THE SIZE OF THE INTERMEDIATE SET BASED ON ONE OR MORE PARAMETERS INCLUDED IN THE CSI REPORT CONFIGURATION

1015

DETERMINE THE PLURALITY OF FD BASES FOR EACH LAYER BASED ON THE INTERMEDIATE SET, WHEREIN THE PLURALITY OF FD BASES ARE CHARACTERIZED BY A RANK-SPECIFIC AND LAYER-SPECIFIC M VALUE INDICATIVE OF A NUMBER OF FD BASES IN THE PLURALITY OF FD BASES AND BASED ON THE CSI CONFIGURATION

1020

REPORT, TO THE BASE STATION, THE PLURALITY OF FD BASES FOR EACH LAYER BASED ON THE SIZE OF THE INTERMEDIATE SET

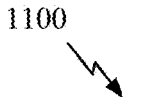

1102

Processing System

1104

Processor

1122

Circuitry for receiving a CSI report configuration

1124

Circuitry for calculating a size of an intermediate set

1126

Circuitry for reporting FD bases according to the intermediate set size

1112

Computer-Readable Medium/Memory

1114

Code for receiving a CSI report configuration

1116

Code for calculating a size of an intermediate set

1118

Code for reporting FD bases according to the intermediate set size

1110

1108

Transceiver

1200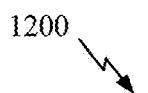

1205

RECEIVING ONE OR MORE REPORTS INDICATIVE OF ONE OR MORE
FREQUENCY DOMAIN (FD) BASES FOR EACH LAYER OF ALL LAYERS
OF A FIRST RANK USED BY A USER EQUIPMENT (UE), THE ONE OR
MORE REPORTS COMPRISING AT LEAST AN INDICATION OF THE ONE
OR MORE FD BASES WITH RESPECT TO THE INTERMEDIATE SET

1210

DETERMINING THE INTERMEDIATE SET BASED ON ONE OR MORE
PARAMETERS AND A SIZE OF THE INTERMEDIATE SET, WHEREIN THE
INTERMEDIATE SET IS COMMON TO ALL OF THE LAYERS OF THE
FIRST RANK, AND THE INTERMEDIATE SET IS A SUBSET OF THE
PLURALITY OF FD BASES

1215

DETERMINING THE ONE OR MORE FD BASES FOR EACH LAYER
BASED ON THE INTERMEDIATE SET AND THE INDICATION, WHEREIN
THE ONE OR MORE FD BASES ARE CHARACTERIZED BY A RANK-
SPECIFIC AND LAYER-SPECIFIC M VALUE INDICATIVE OF A NUMBER
OF THE ONE OR MORE FD BASES

CONFIGURATION OF INTERMEDIATE SET SIZE FOR FREQUENCY DOMAIN BASIS REPORTING

CROSS-REFERENCE TO RELATED APPLICATION(S)

This application is a continuation of U.S. application Ser. No. 17/593,823 filed on Sep. 24, 2021, which is a national stage entry of International Application No. PCT/CN2020/085774, filed Apr. 21, 2020, which claims priority to International Application No. PCT/CN2019/084644, filed Apr. 26, 2019, which are hereby assigned to the assignee hereof, and hereby expressly incorporated by reference herein in their entireties as if fully set forth below and for all applicable purposes.

BACKGROUND

Field of the Disclosure

Aspects of the present disclosure relate to wireless communications, and more particularly, to techniques for determining an indication of an intermediate set size for frequency domain (FD) basis reporting.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the disclosure relate to a method for communication by a user equipment (UE) in a wireless network, comprising: receiving, from a base station, channel state information (CSI) report configuration, configuring the UE for reporting frequency domain (FD) basis information including one or more parameters configured by the base station for calculating a size corresponding to an intermediate set of a plurality of frequency domain (FD) bases, wherein the intermediate set is common to all layers of a first rank, and the intermediate set is a subset of the plurality of FD bases; determining the size of the intermediate set based on one or more parameters included in the CSI report configuration; determining one or more FD bases for each layer based on the intermediate set, wherein the one or more FD bases are characterized by an M value indicative of a number of the one or more FD bases and based on the CSI report configuration; and reporting the one or more FD bases for each layer based on the size of the intermediate set.

Certain aspects of the disclosure relate to a method for communication by a base station in a wireless network, comprising: receiving one or more reports indicative of one or more frequency domain (FD) bases for each layer of all layers of a first rank used by a user equipment (UE), the one or more reports comprising at least an indication of the one or more FD bases with respect to an intermediate set; determining an intermediate set based on one or more parameters and a size of the intermediate set, wherein the intermediate set is common to all of the layers of the first rank, and the intermediate set is a subset of the one or more FD bases; and determining the one or more FD bases for each layer based on the intermediate set and the indication, wherein the one or more FD bases are characterized by an M value indicative of a number of the one or more FD bases.

Certain aspects of the disclosure relate to A user equipment (UE), comprising: a memory; and a processor coupled to the memory, the processor and the memory configured to: receive, from a base station, channel state information (CSI) report configuration, configuring the UE for reporting frequency domain (FD) basis information including one or more parameters configured by the base station for calculating a size corresponding to an intermediate set of a plurality of frequency domain (FD) bases, wherein the intermediate set is common to all layers of a first rank, and the intermediate set is a subset of the plurality of FD bases; determine the size of the intermediate set based on one or more parameters included in the CSI report configuration; determine one or more FD bases for each layer based on the intermediate set, wherein the one or more FD bases are characterized by an M value indicative of a number of the one or more FD bases and based on the CSI report configuration; and report the one or more FD bases for each layer based on the size of the intermediate set.

Certain aspects of the disclosure relate to a base station (BS), comprising: a memory; and a processor coupled to the memory, the processor and the memory configured to: receive one or more reports indicative of one or more frequency domain (FD) bases for each layer of all layers of a first rank used by a user equipment (UE), the one or more reports comprising at least an indication of the one or more FD bases with respect to an intermediate set; determine an intermediate set based on one or more parameters and a size of the intermediate set, wherein the intermediate set is common to all of the layers of the first rank, and the intermediate set is a subset of the one or more FD bases; and determine the one or more FD bases for each layer based on the intermediate set and the indication, wherein the one or more FD bases are characterized by an M value indicative of a number of the one or more FD bases.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 illustrates three tables showing example M values according to rank and layer, in accordance with certain aspects of the present disclosure.

FIG. 10 is a flow diagram illustrating example operations for wireless communication by a UE, in accordance with certain aspects of the present disclosure.

FIG. 11 illustrates a communications device that may include various components configured to perform operations for the techniques disclosed herein in accordance with aspects of the present disclosure.

FIG. 12 is a flow diagram illustrating example operations for wireless communication by a base station, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
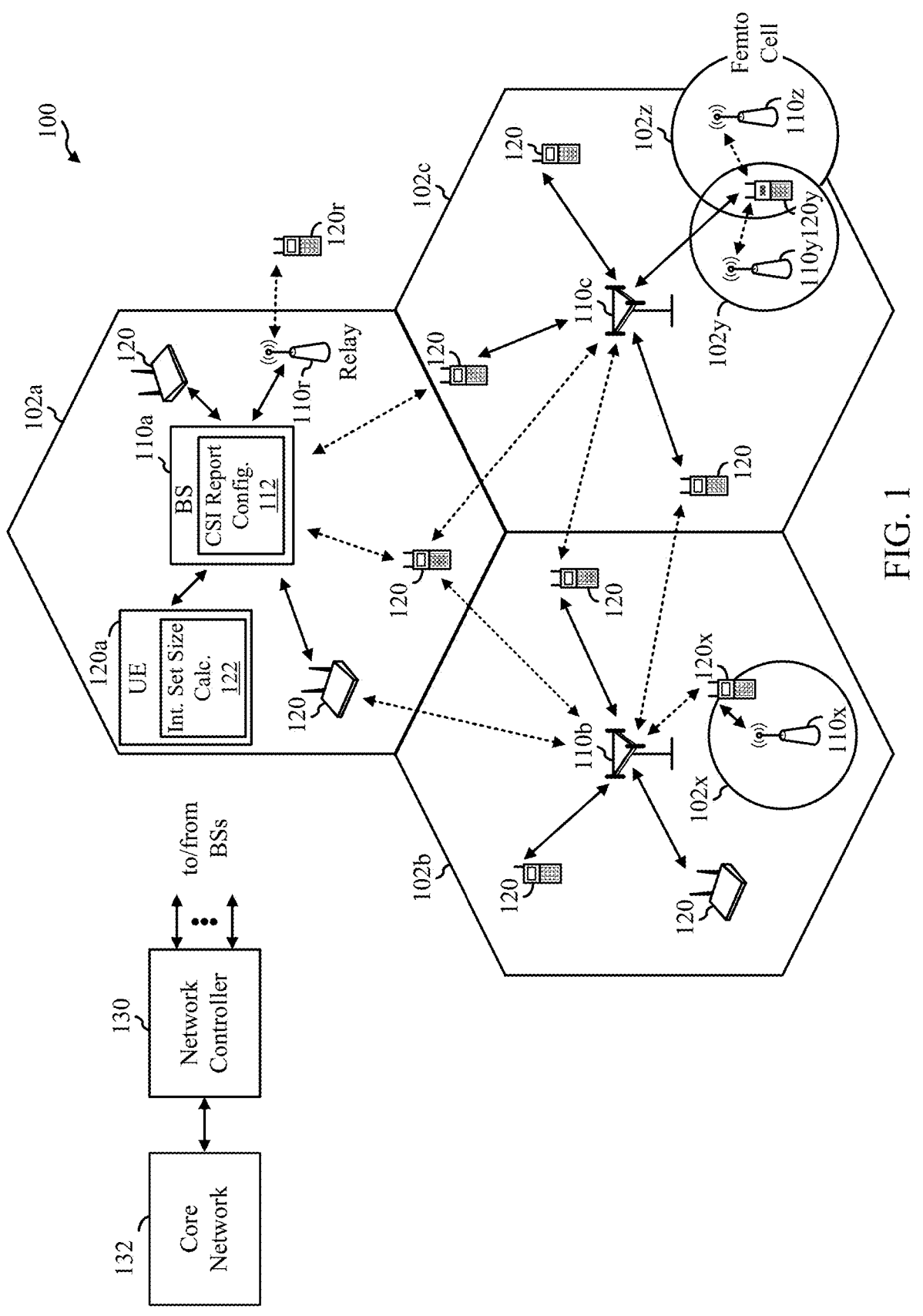
FIG. 1 is a block diagram conceptually illustrating an example telecommunications system, in accordance with certain aspects of the present disclosure.

Aspects of the present disclosure provide apparatus, methods, processing systems, and computer readable mediums for channel state information (CSI) reporting of frequency domain (FD) compression.

In certain systems, such as certain new radio systems (e.g., Release 16 5G NR systems), to save the overhead used for a linear combination codebook (also referred to as a Type II Codebook), a frequency compression based codebook may be used and reported via two stage uplink control information (UCI). In some aspects, the UE may report select FD bases for each layer independently, and the number of FD bases for each layer of each rank is determined based on a configuration from the network. In some aspects, a two-stage FD basis report is used to indicate the FD basis selection for each layer to the network. The first stage uses an intermediate set, while the second stage comprises individual FD basis report for each layer.

In some cases the size of the intermediate set is reported by the UE. That is, the UE freely selects the FD bases for each layer from a total number of $N_3$ FD bases; and the UE determines the intermediate set that covers the union of the FD bases selected for each layer. The UE needs to report the size of the intermediate set in UCI part 1 and report information related to the intermediate set in UCI part 2, and report individual FD basis for each layer in UCI part 2. In some other aspects, the size of the intermediate set is configured by the network or derived by the UE based on some other configured parameters following a rule fixed in the spec, or the size is explicitly specified in the a wireless communication specification. In this case, the UE needs to find an intermediate set common for all layers of a certain rank based on the size of the intermediate set. Then UE does not need to report the size, but may or may not need to report the information of the intermediate set in UCI part 2, and also report the individual FD bases for each layer in UCI part 2 from the intermediate set.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. As shown in FIG. 1, the wireless communication network 100 may be in communication with a core network 132. The core network 132 may be in communication with one or more base station (BSs) 110 and/or user equipments (UEs) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured to determine a configuration of an intermediate set size for frequency domain (FD) basis selection. For example, the BS 110a has a CSI report configuration module 112 that may be configured for generating one or more CSI report parameters and transmitting the parameters to the UE 120a, according to aspects described herein. The UE 120a has an intermediate set size calculation module 122 that may be configured for determining precoding matrix information, including, for each layer, a common indication of a size of an intermediate set of frequency domain (FD) bases and an FD basis selection based on the intermediate set size. The intermediate set size calculation module 122 may allow the UE 120 to report, to the BS 110, in a first part of uplink control information (UCI), the indication of the size of the intermediate set of FD bases across all layers and, in a second part of UCI, the FD basis selection for the specific transmission layer, according to aspects described herein.

In one example, a UE 120a in the wireless communication network 100 may receive a channel state information (CSI) report configuration from the BS 110a. The CSI report configuration configures the UE 120a for CSI reporting. The CSI report configuration configures the UE 120a to determine precoding matrix information and an FD basis selection for each transmission layer based at least in part on an intermediate set size, wherein the intermediate set size is known between devices (e.g., BS 110 and UE 120) and based on a wireless network configuration or rule. The UE 120a may report, in a UCI, the FD basis selection for the specific transmission layer.

In some cases the size of the intermediate set is reported to the BS 110a by the UE 120a. That is, the UE 120a selects the FD bases for each layer from a total number of $N_3$ FD bases, and the UE 120a determines the intermediate set that covers the union of the FD bases selected for each layer. The UE 120a may need to report the size of the intermediate set in UCI part 1 and report information related to the intermediate set in UCI part 2, and report individual FD basis for each layer in UCI part 2. In some other aspects, the size of the intermediate set is configured by the network or derived by the UE 120a based on some other configured parameters following a rule fixed in the spec, or the size is explicitly specified in the a wireless communication specification. In this case, the UE 120a will determine an intermediate set common for all layers of a certain rank (e.g., a rank indicator (RI) provided to the BS 110a by the UE 120a) based on the size of the intermediate set. Then UE 120a does not need to report the size of the intermediate set, but may report the information of the intermediate set in UCI part 2, and also report the individual FD bases for each layer in UCI part 2 from the intermediate set.

In certain aspects, the BS 110a may determine the intermediate set and size of the intermediate set (e.g., NY) using the same or similar methods as discussed herein for the UE 120a. For example, the BS 110a may utilize the same equations discussed for the UE 120a. The information for making the determinations may be available to the BS 110a as discussed with respect to the UE 120a.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
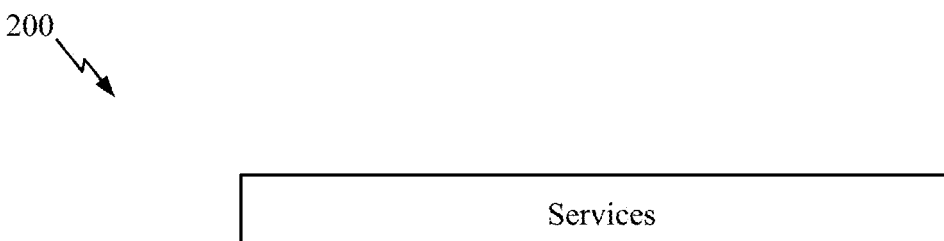
FIG. 2 is a block diagram showing examples for implementing a communication protocol stack in the example RAN architecture, in accordance with certain aspects of the present disclosure.
Figure 2:
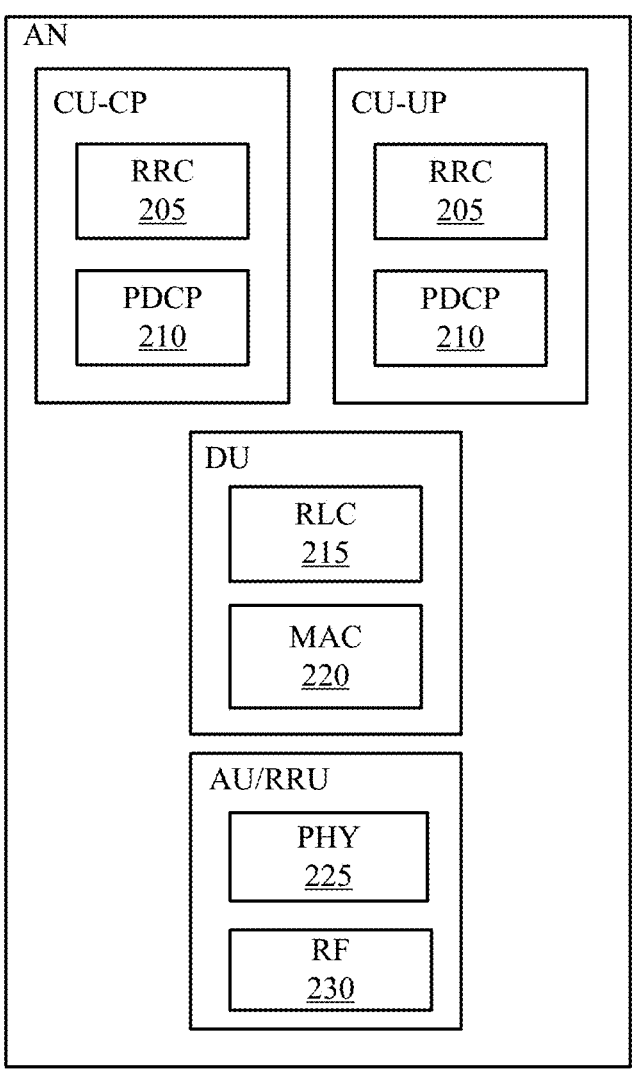
Figure 2:
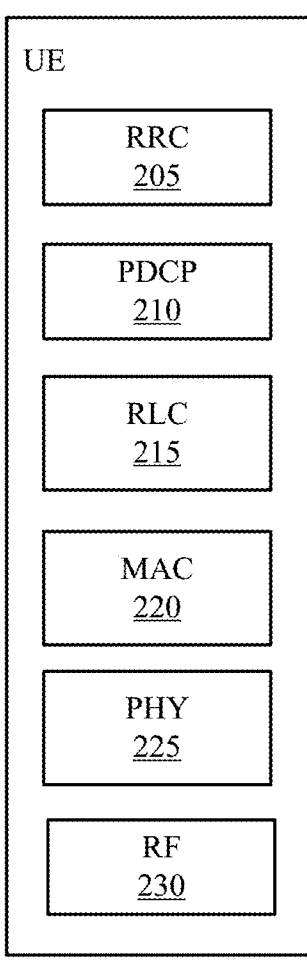

FIG. 2 illustrates a diagram showing examples for implementing a communications protocol stack 200 in a wireless communication network (e.g., such as the wireless communication network 100 of FIG. 1), such as a 5G NR system according to aspects of the present disclosure. In various examples, the layers of the protocol stack 200 may be implemented as separate modules of software, portions of a processor or ASIC, portions of non-collocated devices connected by a communications link, or various combinations thereof. Collocated and non-collocated implementations may be used, for example, in a protocol stack for a network access device or a UE (e.g., UE 120 of FIG. 1). As shown in FIG. 2, the system may support various services over one or more protocols. One or more protocol layers of the protocol stack 200 may be implemented by an access node (AN) (e.g., the BS 110 of FIG. 1) and/or the UE.

As shown in FIG. 2, the protocol stack 200 is split in the AN. The RRC layer 205, PDCP layer 210, RLC layer 215, MAC layer 220, PHY layer 225, and RF layer 230 may be implemented by the AN. For example, the CU-CP may implement the RRC layer 205 and the PDCP layer 210. A DU may implement the RLC layer 215 and MAC layer 220. The AU/RRU may implement the PHY layer(s) 225 and the RF layer(s) 230. The PHY layers 225 may include a high PHY layer and a low PHY layer.

The UE may implement the entire protocol stack 200 (e.g., the RRC layer 205, the PDCP layer 210, the RLC layer 215, the MAC layer 220, the PHY layer(s) 225, and the RF layer(s) 230).

Figure 3:
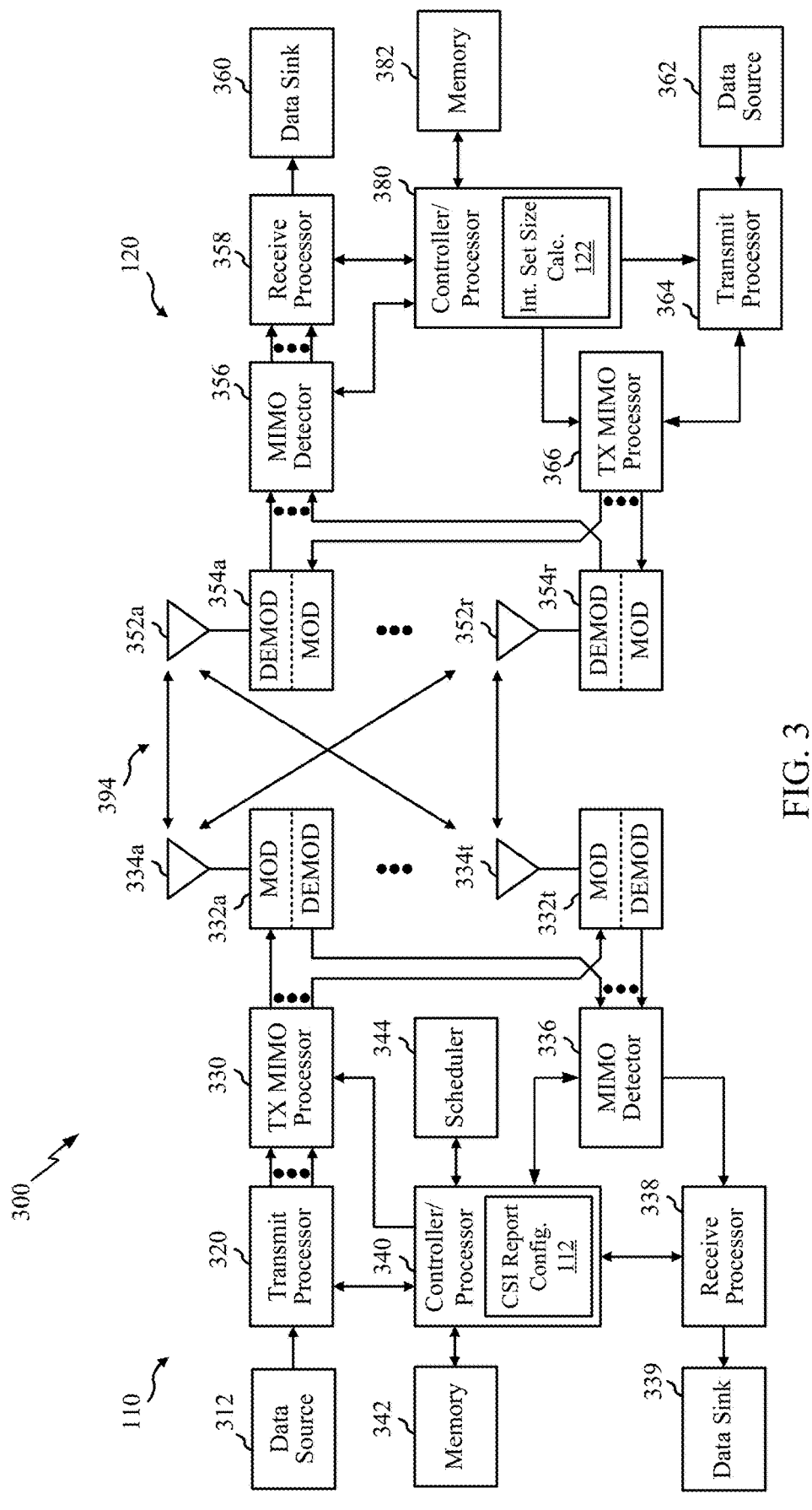
FIG. 3 is a block diagram conceptually illustrating a design of an example base station (BS) and user equipment (UE), in accordance with certain aspects of the present disclosure.

FIG. 3 illustrates example components of BS 110 and UE 120 (as depicted in FIG. 1), which may be used to implement aspects of the present disclosure. For example, antennas 352, processors 366, 358, 364, and/or controller/processor 380 of the UE 120 and/or antennas 334, processors 320, 330, 338, and/or controller/processor 340 of the BS 110 may be used to perform the various techniques and methods described herein. For example, as shown in FIG. 3, the processor 340 of the BS 110 has a CSI report configuration module 112 that may be configured for generating one or more CSI report parameters and transmitting the parameters to the UE, according to aspects described herein. The processor 380 of the UE 120 has an intermediate set size calculation module 122 that may be configured for determining precoding matrix information, including, for each layer, a common indication of a size of an intermediate set of frequency domain (FD) bases and an FD basis selection based on the intermediate set size. The intermediate set size calculation module 122 may allow the UE 120 to report, to the BS 110, in a first part of uplink control information (UCI), the indication of the size of the intermediate set of FD bases across all layers and, in a second part of UCI, the FD basis selection for the specific transmission layer, according to aspects described herein.

At the BS 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) in transceivers 354a through 354r, respectively. Each demodulator 354 may condition (e.g., filter, amplify, down-convert, and digitize) a respective received signal to obtain input samples. Each demodulator may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, de-interleave, and decode) the detected symbols, provide decoded data for the UE 120 to a data sink 360, and provide decoded control information to a controller/processor 380.

In a MIMO system, a transmitter (e.g., BS 120) includes multiple transmit antennas 354a through 354r, and a receiver (e.g., UE 110) includes multiple receive antennas 352a through 352r. Thus, there are a plurality of signal paths 394 from the transmit antennas 354a through 354r to the receive antennas 352a through 352r. Each of the transmitter and the receiver may be implemented, for example, within a UE 110, a BS 120, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas, whichever is lower. In addition, the channel conditions at the UE, as well as other considerations, such as the available resources at the base station, may also affect the transmission rank. For example, the rank (and therefore, the number of transmission layers) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a through 354r (e.g., for SC-FDM, etc.), and transmitted to the base station 110. At the BS 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the BS 110 and the UE 120, respectively. The processor 340 and/or other processors and modules at the BS 110 may perform or direct the execution of processes for the techniques described herein. The memories 342 and 382 may store data and program codes for BS 110 and UE 120, respectively. A scheduler 344 may schedule UEs for data transmission on the downlink and/or uplink.

Figure 4:
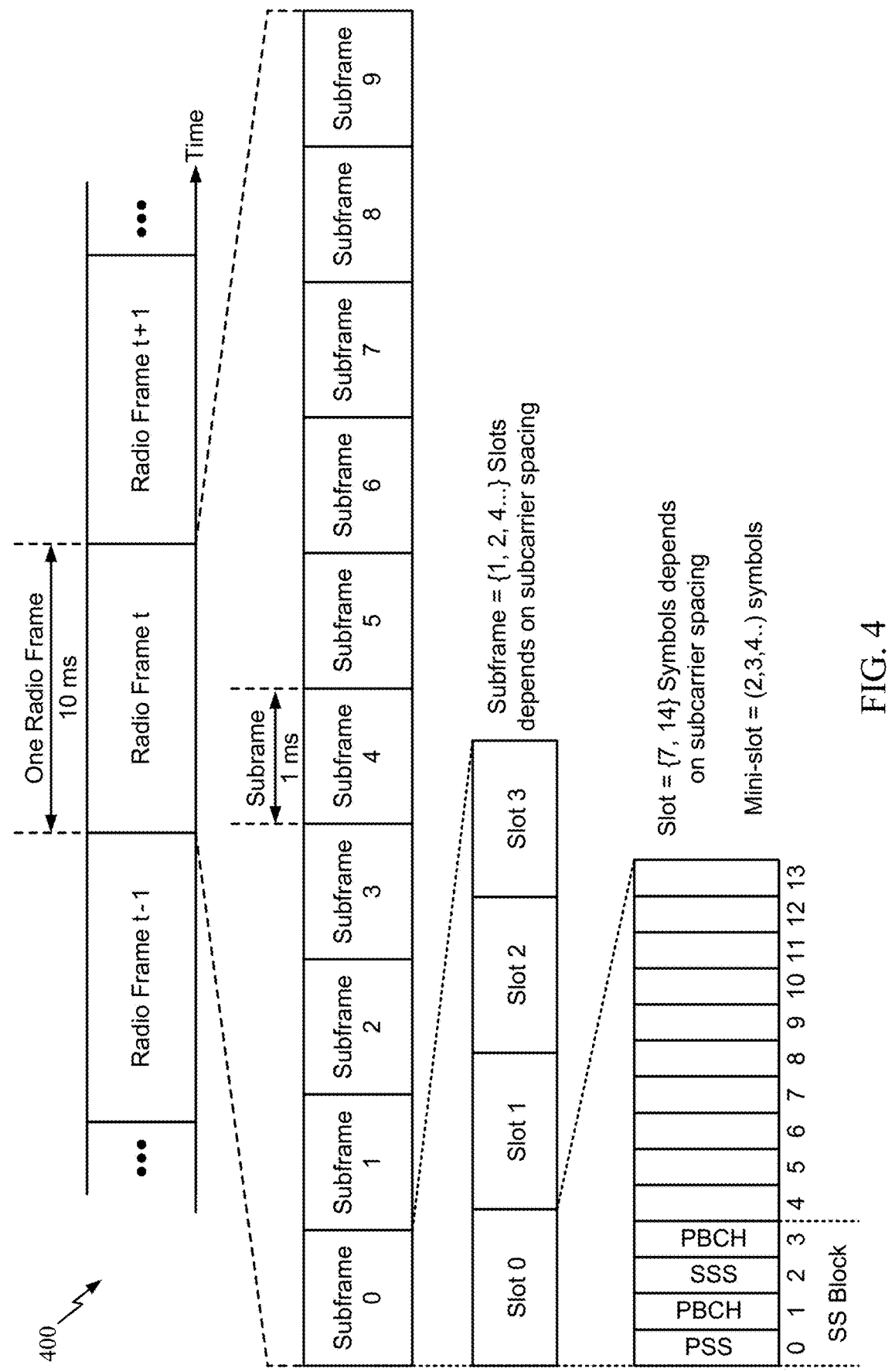
FIG. 4 illustrates an example of a frame format for a telecommunication system, in accordance with certain aspects of the present disclosure.

FIG. 4 is a diagram showing an example of a frame format 400 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 4. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example CSI Report Configuration

Channel state information (CSI) may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

The time and frequency resources that can be used by the UE to report CSI are controlled by a base station (e.g., gNB). CSI may include Channel Quality Indicator (CQI), precoding matrix indicator (PMI), CSI-RS resource indicator (CRI), SS/PBCH Block Resource indicator (SSBRI), layer indicator (LI), rank indicator (RI) and/or L1-RSRP. However, as described below, additional or other information may be included in the report.

The base station may configure UEs for CSI reporting. For example, the BS configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both. The CSI report configuration configures CSI-RS resources for measurement (e.g., CSI-ResourceConfig). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

For the Type II single panel codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems, the UE can be configured via higher layer signaling (e.g., in the CSI report configuration) with one out of two possible subband sizes (e.g., reportFreqConfiguration contained in a CSI-ReportConfig) which indicates a frequency granularity of the CSI report, where a subband may be defined as $$N_{PRB}^{SB}$$

contiguous physical resource blocks (PRBs) and depends on the total number of PRBs in the bandwidth part. The UE may further receive an indication of the subbands for which the CSI feedback is requested. In some examples, a subband mask is configured for the requested subbands for CSI reporting. The UE computes precoders for each requested subband and finds the PMI that matches the computed precoder on each of the subbands.

Compressed CSI Feedback Coefficient Reporting

As discussed above, a user equipment (UE) may be configured for channel state information (CSI) reporting, for example, by receiving a CSI configuration message from the base station. In certain systems (e.g., Release 15 5G NR), the UE may be configured to report at least a Type II precoder across configured frequency domain (FD) units. For example, the precoder matrix $W_r$ for layer r includes the $W_1$ matrix, reporting a subset of selected beams using spatial compression (indicated by the spatial domain beam selection 822 contained in part two 820 of the UCI shown in FIG. 8) and the $W_{2,r}$ matrix, reporting (for cross-polarization) the linear combination coefficients for the selected beams (2L) across the configured FD units:

$$W_r = \sum_{i=0}^{2L-1} b_i \cdot c_i, \text{ where } c_i = [\underbrace{c_{i,0} \ldots c_{i,N_3-1}}_{N_3}],$$

where $b_i$ is the selected beam, ci is the set of linear combination coefficients (i.e., entries of $W_{2,r}$ matrix), L is the number of selected spatial beams, and $N_3$ corresponds to the number of frequency units (e.g., subbands, resource blocks (RBs), etc.). In certain configurations, L is RRC configured. The precoder is based on a linear combination of DFT beams. The Type II codebook may improve MU-MIMO performance. In some configurations considering there are two polarizations, the $W_{2,r}$ matrix has size $2L \times N_3$.

Figure 5:
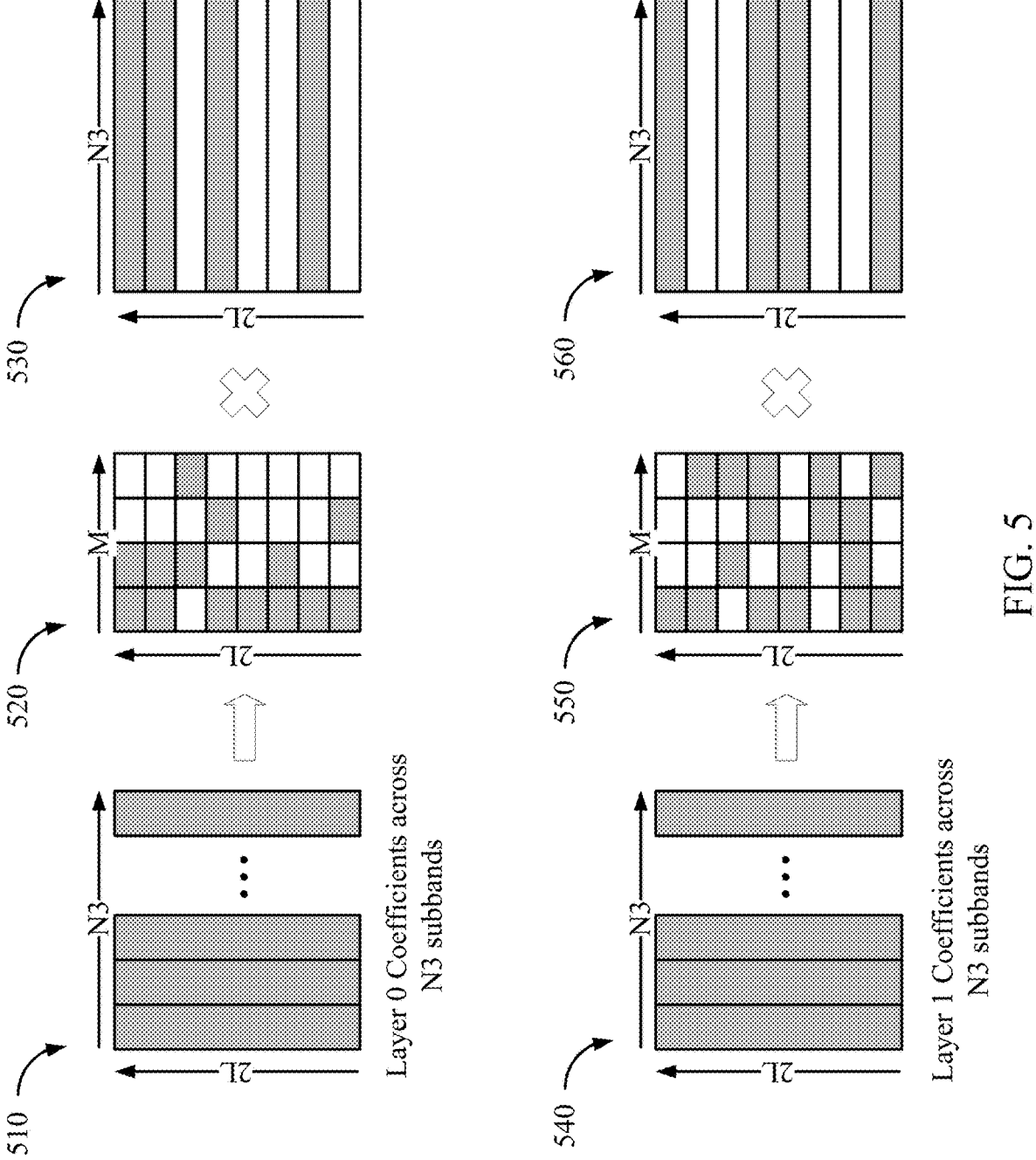
FIG. 5 illustrates a conceptual example of a first precoder matrix for transmission layer 0 and a second precoder matrix for transmission layer 1, in accordance with certain aspects of the present disclosure.

In certain systems (e.g., Rel-16 5G NR), the UE may be configured to report FD compressed precoder feedback to reduce overhead of the CSI report. As shown in FIG. 5, the precoder matrix ($W_{2,i}$) for layer i with i=0,1 may use an FD compression $$W_{f,i}^H$$

matrix to compress the precoder matrix into $\tilde{W}_{2,i}$ matrix size to $2L \times M$ (where M is network configured and communicated in the CSI configuration message via RRC or DCI, and $M < N_3$) given as:

$$W_i = W_1 \tilde{W}_{2,i} W_{f,i}^H$$

Where the precoder matrix $W_i$ (not shown) has $P=2N_1N_2$ rows (spatial domain, number of ports) and $N_3$ columns (frequency-domain compression unit containing RBs or reporting sub-bands), and where M bases are selected for each of layer 0 and layer 1 independently. The $\tilde{W}_{2,0}$ matrix 520 consists of the linear combination coefficients (amplitude and co-phasing), where each element represents the coefficient of a tap for a beam. The $\tilde{W}_{2,0}$ matrix 520 as shown is defined by size $2L \times M$, where one row corresponds to one spatial beam in $W_1$ (not shown) of size $P \times 2L$ (where L is network configured via RRC), and one entry therein represents the coefficient of one tap for this spatial beam. The UE may be configured to report (e.g., CSI report) a subset $K_0 < 2LM$ of the linear combination coefficients of the $\tilde{W}_{2,0}$ matrix 520. For example, the UE may report $K_{NZ,i} < K_0$ coefficients (where $K_{NZ,i}$ corresponds to a maximum number of non-zero coefficients for layer-i with i=0 or 1, and $K_0$ is network configured via RRC) illustrated as shaded squares (unreported coefficients are set to zero). In some configurations, an entry in the $\tilde{W}_{2,0}$ matrix 520 corresponds to a row of $$W_{f,0}^H$$

matrix 530. In the example shown, both the $\tilde{W}_{2,0}$ matrix 520 at layer 0 and the $\tilde{W}_{2,0}$ matrix 550 at layer 1 are $2L \times M$. The $$W_{f,0}^H$$

matrix 530 is composed of the basis vectors (each row is a basis vector) used to perform compression in frequency domain. In the example shown, both the $$W_{f,0}^H$$

matrix 530 at layer 0 and the $$W_{f,1}^H$$

matrix 560 at layer 1 include M=4 FD basis (illustrated as shaded rows) from $N_3$ candidate DFT basis. In some configurations, the UE may report a subset of selected basis of the $$W_{f,i}^H$$

matrix via CSI report. The M bases specifically selected at layer 0 and layer 1. That is, the M bases selected at layer 0 can be same/partially-overlapped/non-overlapped with the M bases selected at layer 1.

Frequency Domain Compression for High Rank Indication

FIG. 6 illustrates three alternative examples for determining the FD basis for a particular RI. Each example is illustrated as a table having a left column indicative of an RI (e.g., RI={1, 2, 3, 4}), and a bottom row indicative of a transmission layer (e.g., layer 0, layer 1, layer 2, layer 3). That is, the number of layers indicate a transmission rank, where RI=1 is limited to a single spatial layer, RI=2 corresponds to two spatial layers, RI=3 corresponds to three spatial layers, and RI=4 corresponds to four spatial layers. Accordingly, type II CSI may relate to UEs having up to four spatial layers.

In some configurations, FD compression for RI={3, 4} is comparable to RI=2. That is, the total number of non-zero coefficients to be reported for RI={3, 4} in $\tilde{W}_{2,i}$ matrix may be about equal to the total number of coefficients reported for RI=2. In some configurations, the UE can report at most $K_0$ total number of coefficients for each layer. For example, the UE can only report up to $K_0$ coefficients at RI=1, and up to $2K_0$ coefficients at RI=2. Thus, the maximum number of non-zero coefficients for a given RI={3,4} can be described as:

$$\sum_{i=0}^{RI-1} K_{NZ,i} \leq 2K_0$$

In some configuration, for RI={3,4}, UE may freely allocate the at most 2K0 coefficients across all layers; in some other configuration, for RI={3,4}, UE may allocate no more than K0 coefficients for each layer of the 3 or 4 layers.

Similarly, the FD basis ($M_i$) for RI={3, 4} is comparable to RI=2. In one example, each layer (layer 0 and layer 1) of RI=2 uses M number of FD basis, making the FD basis across all four layers of RI=4 comparable to 2M. That is, $M_i$ for a given RI can be described as:

$$\sum_{i=0}^{RI-1} M_i \approx 2M$$

In the example shown in FIG. 5, the $$W_{f,0}^H$$

matrix 530 includes FD basis M=4 ($M_0$=4), and the $$W_{f,1}^H$$

matrix 560 includes FD basis M=4 ($M_1$=4), making a total of 8 FD bases for RI=2. Thus, for RI={3,4} the total number of FD bases across all four layers should be comparable to $M_0$+$M_1$ or 2M (e.g., between 6 and 10 FD basis for RI={3, 4}).

As shown in FIG. 6, a first table 610 illustrates an example for adjusting the total number of FD bases for RI={3, 4} such that they are comparable to RI=2. In this example, the total number of FD bases for RI=2 is 2M. Thus, in order to ensure that the summation of $M_i$ for all layers of RI={3, 4} is comparable to RI=2, $M_2$ and $M_3$ are set to value M2 which is less than the total number of FD basis (M) for layers 0 and 1. Accordingly, if M2 is equal to one, then the total number of FD basis for RI=4 is (2M+2) and the total number of basis for RI=3 is (2M+1), where the total number of FD basis for RT=2 is 2M. In some cases, M2 may be set in the spec equal to M/2 or ⅔*M.

A second table 620 illustrates another example for making the total number of FD basis for RI={3, 4} comparable to RI=2. In this example, the FD basis for each of layers 0-3 is M2 for RI={3, 4}. In some cases, M2 may be set in the spec equal to M/2 or ⅔*M. A third table 630 illustrates another example for making the total number of FD basis for RI={3, 4} comparable to RI=2. In this example, each layer of RI={3, 4} may have a different value of M (e.g., RI=4 includes M40, M41, M42, and M43; RI=3 includes M30, M31, and M32). Each value of M is set such that the sum of all FD bases for R={3, 4} is comparable to RI=2. In some cases, if M=7, then it is specified in the spec that M30=5, M31=5, M32=4 and M40=4, M41=4, M42=3, M43=3.

Figure 7:
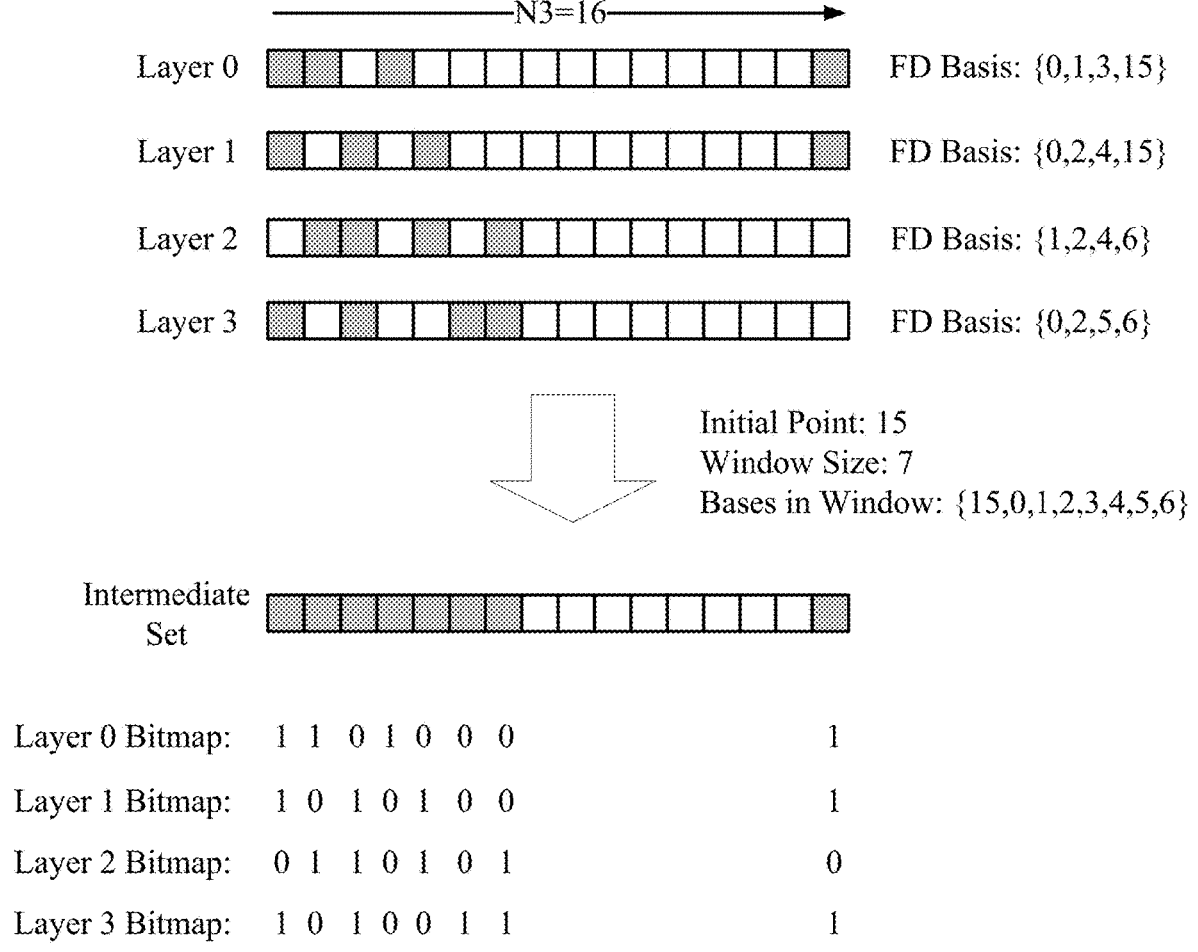
FIG. 7 illustrates an example intermediate set of FD bases from multiple layers, in accordance with certain aspects of the present disclosure.

FIG. 7 illustrates an example intermediate set containing a number of FD bases from multiple layers. As shown, the FD basis for each layer may be described as a bitmap and the intermediate set may be described as a window, wherein the window is characterized by a window size and an initial point. In this example, it is up to UE to determine the size of the intermediate set (i.e., size of the window). UE selects FD basis {0,1,3,15} for layer 0, {0,2,4,15} for layer 1, {1,2,4,6} for layer 2 and {0,2,5,6} for layer 3. Then the UE may determine the window size being 7, while the initial point is 15, indicating the intermediate set containing FD basis {15,0,1,2,3,4,5,6}. In the second stage, the UE uses a 7-bit bitmap to indicate the FD basis for each layer from the intermediate set (i.e., the window).

Example Two-Part Report Configuration

Figure 8:
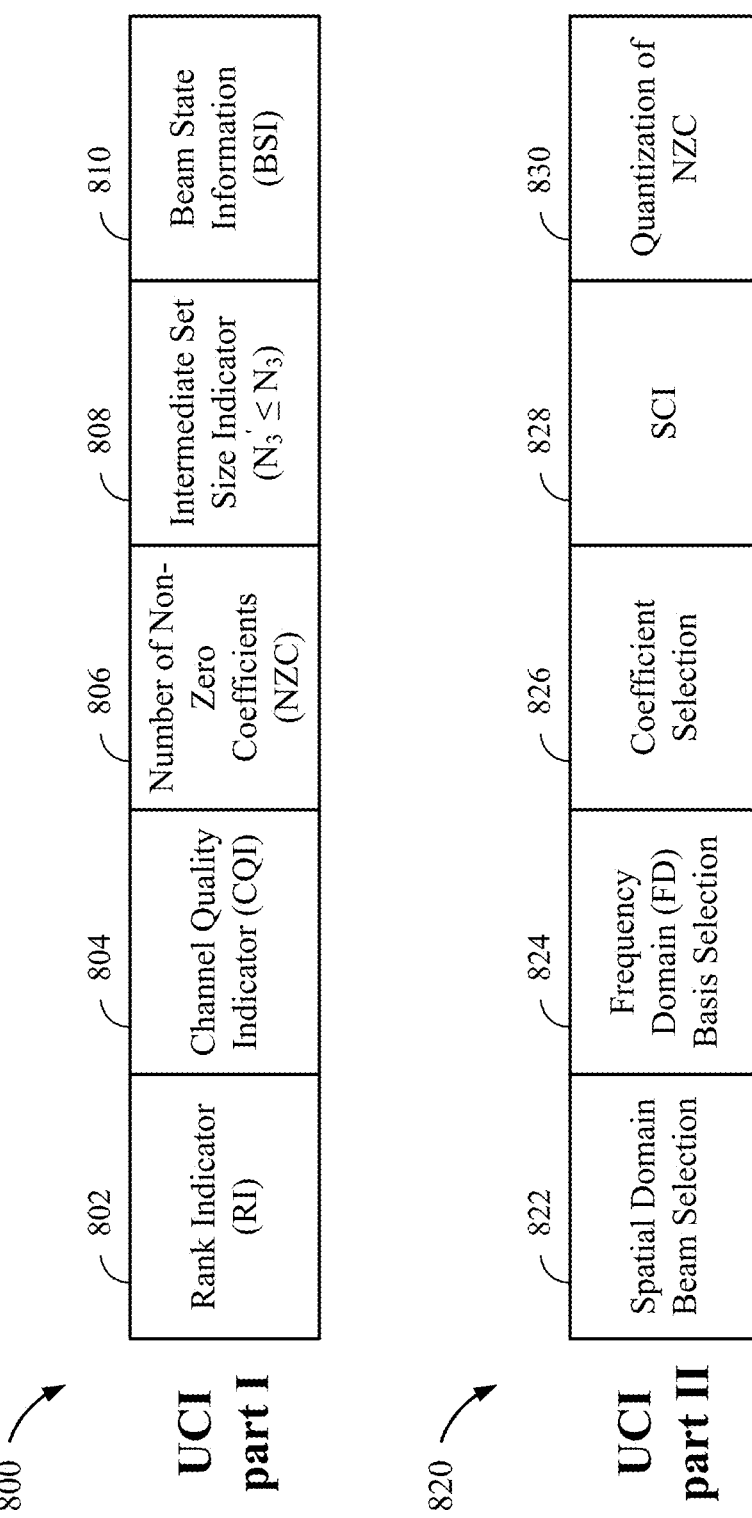
FIG. 8 is a block diagram conceptually illustrating an example two-stage uplink communication information (UCI) message format, in accordance with certain aspects of the present disclosure.

In certain embodiments, the CSI report may include a two-part uplink control information (UCI) report. FIG. 8 illustrates an example two-part uplink control information (UCI) report, wherein a two-stage FD report for UE reporting of the FD basis selection across all layers may be included. It should be noted that the two-part report reduces communication overhead by focusing the report on a relatively smaller subset (i.e., the intermediate set) of the entire FD basis across all layers in each UCI communication. The two-part report is communicated via PUCCH or PUSCH utilizing two parts of UCI. In some examples, each part of the UCI is transmitted at different times to reduce UL bandwidth overhead. In some examples, the first part and the second part are each transmitted over the same or different frequencies. First part 800 of the UCI report includes one or more of the RI 802, CQI 804, a number of non-zero coefficients (NNZC) 806, optionally an intermediate set indicator $$(N_3')$$

808, and beam state information (BSI) 1110. Second part 820 of the UCI report includes a spatial domain beam selection 822 (e.g., reporting a subest of selected beams using spatial compression), an FD basis selection 824 including the two-stage FD basis report for one or more layers (e.g., layer 0 to RI-1), a coefficient selection 826 for one or more layers, an strongest coefficient indicator (SCI) 828 for one or more layers, and a quantization of NZCs 830 for one or more layers. In some cases, UCI part 1 800 may contain RI 802, CQI 804, NNZC (806). The CQI 804 comprises wideband and/or subband CQI reporting. The NNZC may indicate a total NNZC across all layers of the reported RI. In some other cases, the NNZC may indicate NNZC of each layer of the reported RI.

In some configurations where the size of the intermediate set is reported by UE, first part 800 provides an intermediate set indicator $$(N_3')$$

that is smaller or equal to the total number of FD basis ($N_3$) for all layers, where $N_3$ corresponds to frequency domain units (e.g., subbands, resource blocks (RBs), etc.). In some configurations, the size of the intermediate set is configured by the NW or derived using other parameters following a rule fixed in the spec. Accordingly, In UCI part 2 820, UE may further report information related to the intermediate set. For instance, if bitmap or combinatorial number is used, UE needs to report which are the N3' FD basis in the intermediate set. The number of bits of combinatorial number is given by:

$$\left\lceil \log_2 \binom{N_3}{N_3'} \right\rceil$$

while the number of bits of bitmap is $N_3$ with number of "1"s equal to $$N_3'.$$

This means that a specific $N'_3$ FD basis are selected from the entire $N_3$ FD basis and are included in the intermediate set.

In some other examples, if a window is used to report the FD basis, the UE needs to report the initial point of the window $M^{initial}$ using $\lceil \log_2 N_3 \rceil$ bits indicating the FD bases with indices mod$\{M^{initial}+n, N_3\}$ with $$n = 0, 1, \ldots N_3' - 1$$

are included in the intermediate set. In some other aspects, the UE does not need to report further information of the intermediate set in the UCI part 2. For example, if the intermediate set is explicitly configured, then UE does not need to report information related to intermediate set. If a window is used to define the intermediate set and the initial point of the window is configured or fixed, UE does not need to report the information related to the intermediate set. Moreover, in UCI part, UE needs to report the FD basis for each layer individually based on the intermediate set and its size $$(N_3').$$

For example, the UE may determine FD basis selection 824 information corresponding to the size of the intermediate set $$(N_3')$$

based on a $$N_3' - \text{bit}$$

bitmap or combination number. In some examples, the combinatorial number may be given by:

$$\left\lceil \log_2 \binom{N_3'}{M_i} \right\rceil$$

Where $M_i$ is the number of basis for layer i. Accordingly, the UE utilizes the combination number to select $M_i$ basis out of the $$N_3'$$

FD bases included in the intermediate set $$(N_3').$$

As discussed above, in certain systems, such as Rel-16 5G NR systems, to save overhead, a user equipment (UE) is configured to report an indication of a size of the intermediate set $$(N_3')$$

for all layers. In some configurations, $$N_3'$$

is determined based on a number of FD bases for one or more layers of one or more ranks. In other configurations, $$N_3'$$

is determined per rank based on the number of FD bases for one or more layers of a corresponding rank.

Configuration of Intermediate Set Size for FD Basis Report where $$N_3'$$

is Rank-Common

In a first rank-common scheme, $$N_3'$$

is calculated is based on the maximum value of all M values across all layers and all ranks. That is, referring back to the tables of FIG. 6, the UE determines the maximum M value of all M values across ranks and layers. In this example, $$N_3'$$

is given by:

$$N_3' = \alpha \times M_{max}, \quad \text{where } M_{max} = \max_{r,i}(M_{r,i}),$$

and where $M_{r,i}$ is the number of FD basis for layer i or rank r, and where a is a fixed, or UE-specific integer configured by the network (e.g., gNB) via RRC message or downlink control information (DCI). In some examples, $\alpha=1.5$ or 2. Referring to any of the tables of FIG. 6, the UE can calculate $$N_3'$$

by determining the maximum value of all ten M values that correspond to each rank (RI value) and layer combination, then calculating the product of that value multiplied by $\alpha$ to determine the intermediate set size. In some cases, $M_{r,i}$ is rank-dependent but common to all layers associated with a certain rank, e.g., $M_{r,0}=M_{r,1}=\ldots=M_{r,r-1}$. In this case, denoting the common value for each rank by $M_r$, then $$N_3' = \alpha \times M_{max},$$

where $M_{max} = \max_r(M_r)$.

In some cases, if $M_1$ is the greatest value among all ranks, then $$N_3' = \alpha \times M_1.$$

In a second rank-common scheme, $$N_3'$$

is calculated based on the maximum value of the summation of M values in each rank. That is, whether $$N_3'$$

is calculated is based on the maximum value of all M values across all layers and all ranks. In this example, $$N_3'$$

is given by:

$$N_3' = \alpha \times \max_r \sum_{i=0}^{r-1} M_{r,i}$$

That is, the UE calculates the summation of all M values of each rank, and determines which summation value results in the highest value (i.e., which rank provides the highest value when the number of FD basis are summed across all layers), where a is a fixed, or UE-specific integer configured by the network (e.g., gNB) via RRC message or downlink control information (DCI). The UE then scales the maximum summation value by calculating the product of that value by a to determine $$N_3'.$$

In some examples, $\alpha=0.75$ or 1. Referring to any of the tables of FIG. 6, the UE can calculate $$N_3'$$

by determining the maximum M value across all layers corresponding to an RI value.

In some configurations, $$N_3'$$

may be further dependent on the total number of FD basis (i.e., $N_3$) to ensure that the determined value for $$N_3'$$

is not larger than $N_3$. That is, whether $$N_3'$$

is based on the maximum value of all M values across all layers and all ranks, or based on the maximum value of the summation of M values in each rank, the $$N_3'$$

value can be scaled down, or capped based on $N_3$. For example, if $$N_3'$$

is determined based on the maximum value of all M values across all layers and all ranks (e.g., the first rank-common scheme), and is greater than $N_3$, then the value of $$N_3'$$

may be scaled according to the following:

$$N_3' = \min\{\alpha \times M_{max}, \gamma \times N_3\},$$

where $\gamma$ is a fixed, or UE-specific integer configured by the network (e.g., gNB) via RRC message or downlink control information (DCI). In some examples, $\gamma=0.75$ or 1. Accordingly, the UE may be configured to compare the calculated ($\alpha \times M_{max}$) with ($\gamma \times N_3$), and the intermediate set size is equal to the smaller of the two values.

Moreover, if $$N_3'$$

is based on the maximum value of the summation of M values in each rank (e.g., the second rank-common scheme), the $$N_3'$$

value can be scaled down, or capped based on $N_3$ according to the following:

$$N_3' = \min\left\{\alpha \times \max_r \sum_{i=0}^{r-1} M_{r,i}, \gamma \times N_3\right\}$$

That is, the UE may be configured to compare the calculated $$N_3'$$

with $\gamma \times N_3$, and the intermediate set size is equal to the smaller of the two values.

Configuration of Intermediate Set Size for FD Basis Report where $$N_3'$$

is Rank-Specific

In some aspects, the UE may report select FD bases for each layer independently, and the number of FD bases for each layer of each rank is determined based on a configuration from the network. In some aspects, a two-stage FD basis report is used to indicate the FD basis selection for each layer to the network. The first stage uses an intermediate set, while the second stage comprises individual FD basis report for each layer.

In some cases the size of the intermediate set is reported by the UE. That is, the UE freely selects the FD bases for each layer from a total number of $N_3$ FD bases; and the UE determines the intermediate set that covers the union of the FD bases selected for each layer. In such cases, the UE needs to report the size of the intermediate set in UCI part 1 and report information related to the intermediate set in UCI part 2, and report individual FD basis for each layer in UCI part 2. In some other aspects, the size of the intermediate set is configured by the network or derived by the UE based on some other configured parameters following a rule fixed in the spec, or the size is explicitly specified in the a wireless communication specification. In this case, the UE needs to find an intermediate set common for all layers of a certain rank based on the size of the intermediate set. Then UE does not need to report the size, but still needs to report the information of the intermediate set in UCI part two, and also report the individual FD bases for each layer in UCI part two from the intermediate set.

In a first rank-specific scheme, the intermediate set size is calculated based on the maximum value of a rank-specific number of FD basis (i.e., M values) for one or more layers corresponding to the rank (i.e., RI value). That is, the UE determines the maximum M value for a rank by comparing all M values across the layers of that rank. In this example, $$N_{3,r}'$$

is given by:

$$N_3' = \alpha \times M_{r,max}, \text{ where } M_{r,max} = \max_i(M_{r,i}),$$

Where $M_{r,i}$ is the number of FD basis for layer i at rank r, and where a is a fixed, UE-specific and rank-specific integer configured by the network (e.g., gNB) via RRC message or downlink control information (DCI). In some examples, $\alpha$ is rank-specific. In some examples, a larger $\alpha$ value is adopted for RI={3,4} relative to the $\alpha$ value adopted for RI={1,2} because $M_{r,max}$ for RI={3,4} is smaller than $M_{r,max}$ for RI={1,2}. According to some examples, $\alpha$=1.5 or 2 (e.g., $\alpha$=1.5 for RI={1,2} and $\alpha$=2 for RI={3,4}). Referring to any of the tables of FIG. 6, the UE can calculate $$N_{3,r}'$$

by determining the maximum M value of a layer corresponding to a specific rank, then scaling that maximum value by a to determine the intermediate set size for a specific rank. In this example, the intermediate set size may include one or more $$N_{3,r}'$$

values, wherein each value corresponds to $\alpha$ specific one of the RI values. In some cases, $M_{r,i}$ is rank-dependent but common to all layers associated with a certain rank, e.g., $M_{r,0} = M_{r,1} = \ldots = M_{r,r-1}$. In this case, denoting the common value for rank-r by $M_r$, then $$N_{3,r}' = \alpha \times M_r.$$

In a second rank-specific scheme, $$N_3'$$

is calculated based on the summation of all M values of a specific rank. That is, whether $$N_3'$$

is calculated is based on the maximum value of all M values across all layers and all ranks. In this example, $$N_3'$$

is given by:

$$N_3' = \alpha \times \sum_{i=0}^{r-1} M_{r,i}$$

The UE can calculate $$N_{3,r}'$$

by determining the summation of each M value corresponding to a specific rank, then scaling that summation by $\alpha$ to determine the intermediate set size for a specific rank. According to some examples, $\alpha=0.75$ or 1 (e.g., $\alpha=0.75$ for RI={1,2} and $\alpha=1$ for RI={3,4}). In some cases, a can be rank-specific.

In some configurations, $$N_{3,r}'$$

may be further dependent on the total number of FD basis (i.e., $N_3$) to ensure that the determined value for $$N_3'$$

is not larger than $N_3$. That is, whether $$N_3'$$

is based on the maximum value of a rank-specific M value, or a summation of all M values of a specific rank, the $$N_{3,r}'$$

value can be scaled down, or capped based on $N_3$.
For example, if $$N_{3,r}'$$

is determined based on the maximum value of a rank-specific M value (i.e., the first rank-specific scheme), and is determined to be greater than $N_3$, then the value of $$N_{3,r}'$$

may be scaled according to the following:

$$N_{3,r}' = \min\{\alpha \times M_{r,max}, \gamma \times N_3\},$$

where $\gamma$ is a fixed, UE-specific and rank-specific integer configured by the network (e.g., gNB) via RRC message or downlink control information (DCI). In some examples, $\gamma=0.75$ or 1. Accordingly, the UE may be configured to compare ($\alpha \times M_{r,max}$) with ($\gamma \times N_3$), and the intermediate set size is equal to the smaller of the two values.

Moreover, if $$N_{3,r}'$$

is based on the summation of all M values of a specific rank (i.e., the second rank-specific scheme), the $$N_{3,r}'$$

value can be scaled down, or capped based on $N_3$ according to the following:

$$N_3' = \min\left\{\alpha \times \sum_{i=0}^{r-1} M_{r,i}, \gamma \times N_3\right\}$$

That is, the UE may be configured to compare $$\left(\alpha \times \sum_{i=0}^{r-1} M_{r,i}\right)$$

with ($\gamma \times N_3$), and the intermediate set size is equal to the smaller of the two values.

Additional Aspects of FD Basis Report

In some configurations, the M values of the rank and layer combinations shown in FIG. 6 are determined at least in part by a ratio p configured by the network (e.g., gNB) to control overhead. For example, the M values for RI={1,2} may be given by:

$$M = \left\lceil p \times \frac{N_3}{R} \right\rceil$$

Where R is equal to the number of PMI sub-bands within a CQI sub-band. As discussed above, the M values for RI={3, 4} can be derived from the M values for RI={1,2} shown in the three tables (610, 620, 630) illustrated in FIG. 6. Accordingly, p may be used to determine M values for a corresponding combination of RI values and layers, and may also affect the scale of $$N_3'.$$

According to some examples, R={1,2}, and p={0.25, 0.5}.

In some configurations, the $\alpha$ value may depend on one or more parameters, including: the configured p ratio, a $M_{max}$ value (e.g., $M_{r,max}$ or $M_{max}$), a $$\max_r \sum_{i=0}^{r-1} M_{r,i}$$

value (e.g., a $$\max_r \sum_{i=0}^{r-1} M_{r,i}$$

value or a $$\sum_{i=0}^{r-1} M_{r,i}$$

value), or a configured $N_3$ value. Here, the a value may be dependent on one or more of the foregoing parameters to scale the $$N_3'$$

value and ensure that the value is not too large. For example, as noted above, larger p ratios may generally result in relatively larger M values, and the more overlap of FD basis among layers would happen with a larger M values. In this case, the a value shall not be too large.

In contrast, if the p ratio is too small, then the M value will be relatively smaller, and the less overlap of FD basis among layers would happen with a smaller M values. In this case, a larger $\alpha$ value is needed to capture the FD basis selected for each layer.

In some embodiments, the UE and/or base station is configured to utilize an a value based on a network configuration or rule. In some examples, the base station may communicate one or more a values to the UE based on the network configuration or rule. For example, the UE may include one or more a values provided by the network stored on a local memory that the UE can choose from. In one example, the UE is configured to compare the configured ratio p to a threshold value to determine if p is less than or greater than the threshold. The threshold value may be configured by the network or the UE to ensure that the $$N_3'$$

value cover all FD basis across all layers without overlap. For example, if p is greater than the threshold value, then the UE may select a smaller a value.

In some embodiments, the UE may determine whether to adopt one of the rank-common schemes or a rank-specific scheme based on the configured value of one or more of: a value of M, a ratio of p, or $N_3$. For example, an $$N_3'$$

value determined by summation (i.e., the second rank-common scheme or the second rank specific scheme) may be greater an $$N_3'$$

value determined by maximum M value (i.e., the first rank-common scheme or the first rank specific scheme). Accordingly, if p is less than or equal to the threshold (resulting in a smaller value of M), then the UE may select one of the second rank-common scheme or the second rank specific scheme. Alternatively, of p is greater than the threshold, then the UE may select one of the first rank-common scheme or the first rank specific scheme. This is because a relatively larger M value may cause some extent of overlap for the FD basis across layers. Accordingly, one of the first rank-common scheme or the first rank specific scheme should be used in order to scale the M value used to determine $$N_3'.$$

Figure 9:
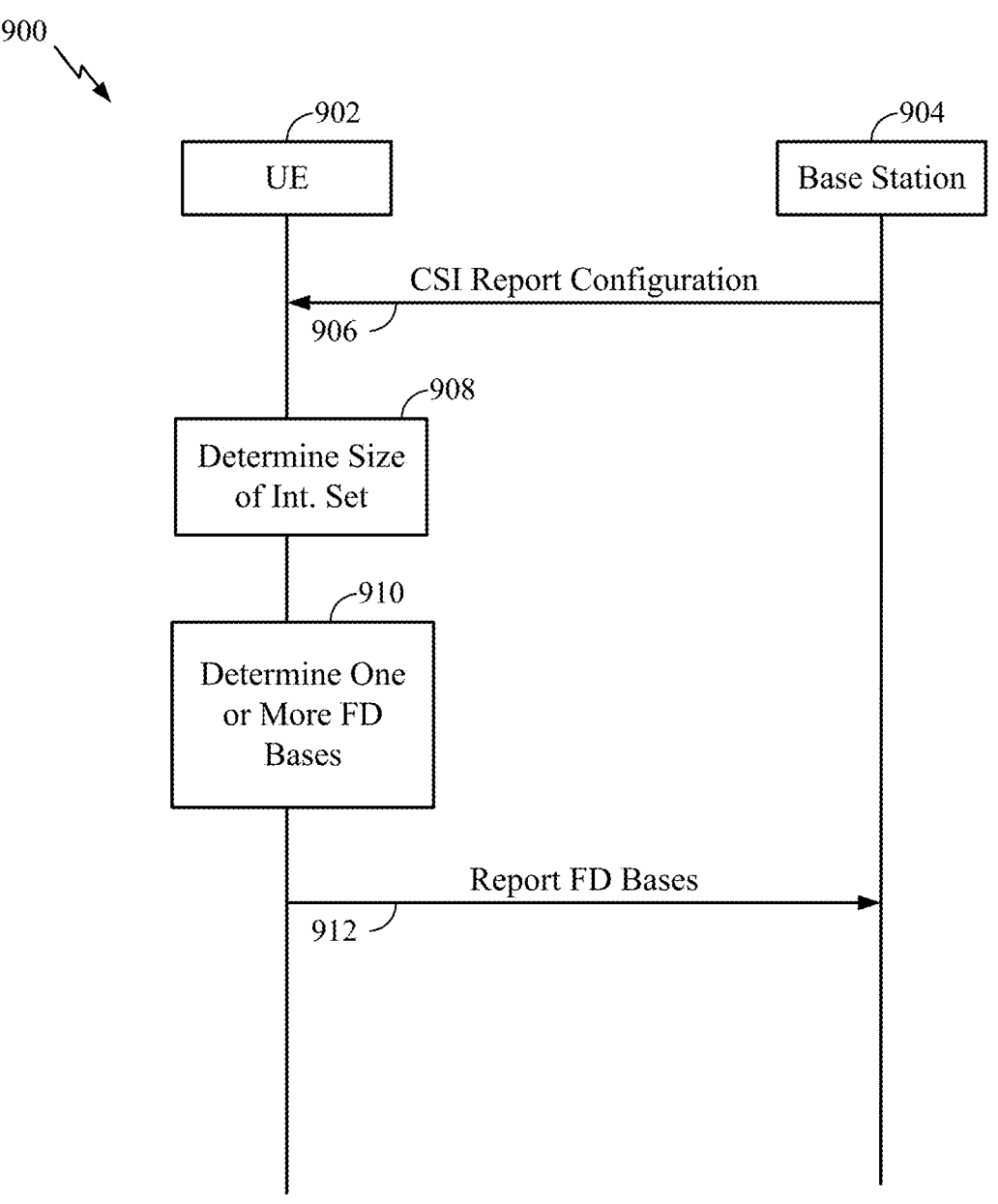
FIG. 9 is a call flow diagram illustrating example operations for wireless communication between a UE and BS, in accordance with certain aspects of the present disclosure.

FIG. 9 is a call flow diagram illustrating example operations for wireless communication 900 between a UE 902 and a base station 904, in accordance with certain aspects of the present disclosure.

Initially, the UE 902 is configured to receive a CSI report configuration message 906 from the BS 904. The CSI report configuration message may be communicated via any of a downlink control information (DCI) message or a radio resource control (RRC) message. The CSI report configuration message 906 may include one or more parameters configured by the base station, the wireless network (e.g., core network), or according to a specification relating to the wireless network (e.g., 3GPP). The one or more parameters may include a p ratio, an a value, an R value, and/or a configured $N_3$ value.

In some configurations, the CSI report configuration message 906 may include one or more p ratios and $\alpha$ values that the UE 902 can store in an internal memory. In some configurations, the R value indicates the number of PMI sub-bands within a CQI sub-band and can be derived by the UE.

In some configurations, the UE 902 is configured to determine a size 908 of an intermediate set according to the parameters of the CSI report configuration message using the systems and methods described herein. The UE 902 then determines 910 one or more FD bases according to the determined size of the intermediate set.

The UE may then transmits 912 a UCI message containing an indication of the one or more FD bases determined at 910.

FIG. 10 is a flow diagram illustrating example operations 1000 for wireless communication by a UE, in accordance with certain aspects of the present disclosure. The example operations 1000 may be performed by a UE. For example, the operations 1000 may be performed by a UE 120 (e.g., the UE 120a) in the wireless communication network 100. Operations 1000 may be implemented as software components that are executed and run on one or more processors (e.g., processor 1104 of FIG. 11). Further, the transmission and reception of signals by the UE in operation 1000 may be enabled, for example, by one or more antennas (e.g., antennas 1110 of FIG. 11). In certain aspects, the transmission and/or reception of signals by the UE may be implemented via a bus interface (e.g., bus 1106 of FIG. 11) of one or more processors obtaining and/or outputting signals.

At 1005, the UE receives a CSI report configuration, from a base station. The CSI report configuration configures the UE for reporting FD basis information including one or more parameters configured by the base station for calculating a size corresponding to an intermediate set of a plurality of FD bases, wherein the intermediate set is common to all layers of a first rank, and the intermediate set is a subset of the plurality of FD bases.

At 1010, the UE determines the size of the intermediate set based on one or more parameters included in the CSI report configuration.

At 1015, the UE determines determine the plurality of FD bases for each layer based on the intermediate set, wherein the plurality of FD bases are characterized by an M value indicative of a number of FD bases in the plurality of FD bases and based on the CSI configuration.

At 1020 the UE reports the plurality of FD bases for each layer based on the size of the intermediate set.

FIG. 11 illustrates a communications device that may include various components configured to perform operations for the techniques disclosed herein, such as the operations illustrated in FIG. 10. The communications device 1100 includes a processing system 1102 coupled to a transceiver 1108. The transceiver 1108 is configured to transmit and receive signals for the communications device 1100 via one or more antennas 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 10, or other operations for performing the various techniques discussed herein for determining and reporting a size of a intermediate set of FD bases. In certain aspects, computer-readable medium/memory 1112 stores code 1114 for receiving a CSI report configuration message; code 1116 for reporting the FD bases according to the intermediate set size.

In certain aspects, the processor 1104 has circuitry configured to implement the code stored in the computer-readable medium/memory 1112. The processor 1104 includes circuitry 1122 for receiving a CSI report configuration message; circuitry 1124 for calculating a size of an intermediate set; and/or circuitry 1126 for reporting FD bases according to the intermediate set size.

FIG. 12 is a flow diagram illustrating example operations 1200 for wireless communication by a base station, in accordance with certain aspects of the present disclosure. The example operations 1200 may be performed by a base station. For example, the operations 1200 may be performed by a BS 110 in the wireless communication network 100. Operations 1200 may be implemented as software components that are executed and run on one or more processors. Further, the transmission and reception of signals by the base station in operation 1200 may be enabled, for example, by one or more antennas. In certain aspects, the transmission and/or reception of signals by the base station may be implemented via a bus interface of one or more processors obtaining and/or outputting signals.

At 1205, the base station receives one or more reports indicative of one or more frequency domain (FD) bases for each layer of all layers of a first rank used by a user equipment (UE), the one or more reports comprising at least an indication of the one or more FD bases with respect to the intermediate set. The BS may configure the size to the UE, or configuring some other parameters to the UE and derived the size based on the configured other parameters.

At 1210, the base station determines the intermediate set based on one or more parameters and a size of the intermediate set, wherein the intermediate set is common to all of the layers of the first rank, and the intermediate set is a subset of the plurality of FD bases.

At 1215, the base station determines the one or more FD bases for each layer based on the intermediate set and the indication, wherein the one or more FD bases are characterized by an M value indicative of a number of the one or more FD bases.

In certain aspects, the BS may determine the intermediate set and size of the intermediate set (e.g., N3') using the same or similar methods as discussed above for the UE. For example, the BS may utilize the same equations previously discussed for the UE. The information for making the determinations may be available to the BS as discussed with respect to the UE.

Example Embodiments

Embodiment 1: A method for communication by a user equipment (UE) in a wireless network, comprising receiving, from a base station, channel state information (CSI) report configuration, configuring the UE for reporting frequency domain (FD) basis information including one or more parameters configured by the base station for calculating a size corresponding to an intermediate set of a plurality of frequency domain (FD) bases, wherein the intermediate set is common to all layers of a first rank, and the intermediate set is a subset of the plurality of FD bases; determining the size of the intermediate set based on one or more parameters included in the CSI report configuration; determining one or more FD bases for each layer based on the intermediate set, wherein the one or more FD bases are characterized by an M value indicative of a number of the one or more FD bases and based on the CSI configuration; and reporting the one or more FD bases for each layer based on the size of the intermediate set.

Embodiment 2: The method Embodiment 1, wherein determining the size of the intermediate set is based on a maximum M value across all layers and all ranks.

Embodiment 3: The method of Embodiment 2, wherein determining the size of the intermediate set further comprises scaling the maximum M value across all layers and all ranks by a first scaling factor $\alpha$ to determine a first value.

Embodiment 4: The method of Embodiment 1, wherein determining the size of the intermediate set is based on one or more summations of M values for each rank across all layers of each rank.

Embodiment 5: The method of Embodiment 4, further comprising: calculating a summation of M values for each rank across all layers of each rank; determining a maximum value among the one or more summations of M values for one or more ranks; and scaling the maximum value based on a first scaling factor $\alpha$ to determine a first value.

Embodiment 6: The method of Embodiment 1, wherein determining the size of the intermediate set is based on a maximum M value across all layers for a particular rank.

Embodiment 7: The method of Embodiment 6, wherein determining the size of the intermediate set further comprises scaling the maximum M value across all layers for the particular rank by a first scaling factor α to determine a first value.

Embodiment 8: The method of Embodiment 1, wherein determining the size of the intermediate set for a particular rank is based on a summation of M values across all layers of the particular rank.

Embodiment 9: The method of Embodiment 8, further comprising: calculating a summation of M values across all layers of the particular rank; and scaling the summation based on a first scaling factor α to determine a first value.

Embodiment 10: The method of any of Embodiments 3, 5, 7, or 9, wherein a is configured by one or more of RRC messaging, a medium access control-control element (MAC-CE), downlink configuration information (DCI), a configuration of the wireless network, information contained in a wireless communication specification, or information derived from one or more parameters following a rule predefined in the wireless communication specification.

Embodiment 11: The method of any of Embodiments 3, 5, 7, or 9, wherein a is uniquely configured or derived or specified for each rank.

Embodiment 12: The method of any of Embodiments 3, 5, 7, or 9 wherein determining the size of the intermediate set further comprises: determining a total number of the plurality of FD bases $N_3$; scaling the total number of the plurality of FD bases $N_3$ by a second scaling factor γ to determine a second value; and comparing the first value with the second value to determine which of the first value and the second value is smallest.

Embodiment 13: The method of Embodiment 12, wherein γ is configured by one or more of the network via RRC messaging, a medium access control-control element (MAC-CE), downlink configuration information (DCI), information contained in a specification of the wireless network, or information derived from one or more parameters following a rule predefined in the specification.

Embodiment 14: The method of Embodiment 12, wherein y is uniquely configured or derived or specified for each rank.

Embodiment 15: The method of Embodiment 1, wherein the M value is derived based on a ratio p configured by the wireless network, and following a rule predefined in a wireless communication specification.

Embodiment 16: The method of Embodiment 1, further comprising determining a first scaling factor α based on at least one of: a configured ratio p, the determined maximum M values across all layers and all ranks, or the derived maximum summation of M values for all ranks.

Embodiment 17: The method of Embodiment 16, if at least one of: the configured ratio p, or the determined maximum M values across all layers and all ranks, or the derived maximum summation of M values for all ranks is greater than a threshold, determining the first scaling being a smaller value among a set of candidate values; and if at least one of: the configured ratio p, or the determined maximum M values across all layers and all ranks, or the derived maximum summation of M values for all ranks is smaller than or equal to a threshold, then determining first scaling being a larger value among a set of candidate values.

Embodiment 18: The method of Embodiment 1, further comprising if at least one M value is greater than a threshold, determining the size of the intermediate set based on the maximum value of the M values across all layers; and if at least one M value is smaller than or equal to a threshold, determining the size of the intermediate set, comprising: calculating a summation of M values for each rank across all layers of each rank; determining a maximum value among the summations of M values for one or more rank; and determining the size of the intermediate set based on the maximum value.

Embodiment 19: The method of Embodiment 1, wherein the M value is indicative of at least one M value for one layer different from other M values for other layers.

Embodiment 20: The method of Embodiment 1, further comprising determining the M value based on the total number of FD bases N3 and the number of PMI subbands within a CQI subband, where in N3 is determined based on NW configuration, and the number of PMI subbands within a CQI subband is NW configured.

Embodiment 21: A method for communication by a base station in a wireless network, comprising: receiving one or more reports indicative of one or more frequency domain (FD) bases for each layer of all layers of a first rank used by a user equipment (UE), the one or more reports comprising at least an indication of the one or more FD bases with respect to an intermediate set; determining an intermediate set based on one or more parameters and a size of the intermediate set, wherein the intermediate set is common to all of the layers of the first rank, and the intermediate set is a subset of the one or more FD bases; and determining the one or more FD bases for each layer based on the intermediate set and the indication, wherein the one or more FD bases are characterized by a M value indicative of a number of the one or more FD bases.

Embodiment 22: The method Embodiment 21, wherein the size of the intermediate set is based on a maximum M value across all layers for a particular rank.

Embodiment 23: The method of Embodiment 22, wherein the maximum M value is scaled across all layers for the particular rank by a first scaling factor α.

Embodiment 24: The method of Embodiment 21, wherein the size of the intermediate set for a particular rank is based on a summation of M values across all layers of the particular rank.

Embodiment 25: The method of Embodiment 21, further comprising determining a first scaling factor α based on at least one of: a configured ratio p, the determined maximum M values across all layers and all ranks, or the derived maximum summation of M values for all ranks.

Embodiment 26: A user equipment (UE), comprising: a memory; and a processor coupled to the memory, the processor and the memory configured to: receive, from a base station, channel state information (CSI) report configuration, configuring the UE for reporting frequency domain (FD) basis information including one or more parameters configured by the base station for calculating a size corresponding to an intermediate set of a plurality of frequency domain (FD) bases, wherein the intermediate set is common to all layers of a first rank, and the intermediate set is a subset of the plurality of FD bases; determine the size of the intermediate set based on one or more parameters included in the CSI report configuration; determine one or more FD bases for each layer based on the intermediate set, wherein the one or more FD bases are characterized by a M value indicative of a number of the one or more FD bases and based on the CSI report configuration; and report the one or more FD bases for each layer based on the size of the intermediate set.

Embodiment 27: The UE of embodiment 26, wherein the size of the intermediate set is based on a maximum M value across all layers and all ranks.

Embodiment 28: The UE of embodiment 27, wherein the M value is indicative of at least one M value for one layer different from other M values for other layers.

Embodiment 29: The UE of embodiment 26, wherein the memory and the processor, being configured to determine the size of the intermediate set, are further configured to scale the maximum M value across all layers and all ranks by a first scaling factor α to determine a first value.

Embodiment 30: The UE of embodiment 26, wherein: if at least one M value is greater than a first threshold, the processor and the memory are further configured to determine the size of the intermediate set based on the maximum value of the M values across all layers; and if at least one M value is smaller than or equal to a second threshold, the processor and the memory are further configured to: calculate a summation of M values for each rank across all layers of each rank; determine a maximum value among the summations of M values for one or more rank; and determine the size of the intermediate set based on the maximum value.

Embodiment 31: The UE of Embodiment 26, wherein determining the size of the intermediate set is based on one or more summations of M values for each rank across all layers of each rank.

Embodiment 32: A base station, comprising: a memory; and a processor coupled to the memory, the processor and the memory configured to: receive one or more reports indicative of one or more frequency domain (FD) bases for each layer of all layers of a first rank used by a user equipment (UE), the one or more reports comprising at least an indication of the one or more FD bases with respect to an intermediate set; determine an intermediate set based on one or more parameters and a size of the intermediate set, wherein the intermediate set is common to all of the layers of the first rank, and the intermediate set is a subset of the one or more FD bases; and determine the one or more FD bases for each layer based on the intermediate set and the indication, wherein the one or more FD bases are characterized by a M value indicative of a number of the one or more FD bases.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10 and 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for communication by a user equipment (UE) in a wireless network, comprising:

receiving, from a base station, channel state information (CSI) report configuration, configuring the UE for reporting frequency domain (FD) basis information including one or more parameters for calculating a size corresponding to an intermediate set of a plurality of frequency domain (FD) bases, wherein the intermediate set is common to all layers of a first rank, and the intermediate set is a subset of the plurality of FD bases;

determining the size of the intermediate set based on one or more parameters included in the CSI report configuration and based on a maximum M value across all layers for a particular rank, wherein determining the size of the intermediate set further comprises scaling the maximum M value across all layers for the particular rank by a first scaling factor $\alpha$ to determine a first value;

determining one or more FD bases for each layer according to the size of the intermediate set, wherein the one or more FD bases are characterized by an M value indicative of a number of the one or more FD bases and based on the CSI report configuration; and transmitting, to the base station, an indication of the one or more FD bases for each layer based on the size of the intermediate set.

2. The method of claim 1, wherein a is uniquely configured, derived, or specified for each rank.

3. The method of claim 1, wherein the M value is indicative of at least one M value for one layer different from other M values for other layers.

4. The method of claim 1, further comprising determining the M value based on a total number of FD bases and a number of Precoding Matrix Indicator (PMI) subbands within a Channel Quality Indicator (CQI) subband, wherein the total number of FD bases is determined based on network configuration, and the number of PMI subbands within a CQI subband is network configured.

5. The method of claim 1, wherein the first value is determined as the size of the intermediate set.

6. The method of claim 1, wherein the one or more parameters are configured by the base station.

7. A method for communication by a user equipment (UE) in a wireless network, comprising:

receiving, from a base station, channel state information (CSI) report configuration, configuring the UE for reporting frequency domain (FD) basis information including one or more parameters for calculating a size corresponding to an intermediate set of a plurality of frequency domain (FD) bases, wherein the intermediate set is common to all layers of a first rank, and the intermediate set is a subset of the plurality of FD bases;

determining the size of the intermediate set based on one or more parameters included in the CSI report configuration;

determining one or more FD bases for each layer according to the size of the intermediate set, wherein the one or more FD bases are characterized by an M value indicative of a number of the one or more FD bases, wherein the M value is based on a total number of FD bases and a number of Precoding Matrix Indicator (PMI) subbands within a Channel Quality Indicator (CQI) subband, wherein the total number of FD bases is based on network configuration, and the number of PMI subbands within a CQI subband is network configured; and transmitting, to the base station, an indication of the one or more FD bases for each layer based on the size of the intermediate set.

8. The method of claim 7, wherein the one or more parameters are configured by the base station.

9. A user equipment (UE), comprising:
one or more memories; and
at least one processor coupled to the one or more memories, the at least one processor and the one or more memories configured to cause the UE to:

receive, from a base station, channel state information (CSI) report configuration, configuring the UE for reporting frequency domain (FD) basis information including one or more parameters for calculating a size corresponding to an intermediate set of a plurality of frequency domain (FD) bases, wherein the intermediate set is common to all layers of a first rank, and the intermediate set is a subset of the plurality of FD bases;

determine the size of the intermediate set based on one or more parameters included in the CSI report configuration and based on a maximum M value across all layers for a particular rank, wherein to determine the size of the intermediate set, the at least one processor and the one or more memories cause the UE to scale the maximum M value across all layers for the particular rank by a first scaling factor $\alpha$ to determine a first value;

determine one or more FD bases for each layer according to the size of the intermediate set, wherein the one or more FD bases are characterized by an M value indicative of a number of the one or more FD bases and based on the CSI report configuration; and transmit, to the base station, an indication of the one or more FD bases for each layer based on the size of the intermediate set.

10. The UE of claim 9, wherein $\alpha$ is uniquely configured, derived, or specified for each rank.

11. The UE of claim 9, wherein the M value is indicative of at least one M value for one layer different from other M values for other layers.

12. The UE of claim 9, wherein the at least one processor and the one or more memories are further configured to cause the UE to:

determine the M value based on a total number of FD bases and a number of Precoding Matrix Indicator (PMI) subbands within a Channel Quality Indicator (CQI) subband, wherein the total number of FD bases is determined based on network configuration, and the number of PMI subbands within a CQI subband is network configured.

13. The UE of claim 9, wherein the first value is determined as the size of the intermediate set.

14. The UE of claim 9, wherein the one or more parameters are configured by the base station.

* * * * *